United States Patent
Drachmann

(10) Patent No.: US 10,004,071 B2
(45) Date of Patent: Jun. 19, 2018

(54) WIRELESS RADIO COMMUNICATION SYSTEM FOR CONSUMPTION METERS

(71) Applicant: APATOR MIITORS APS, Aarhus V (DK)

(72) Inventor: Jens Drachmann, Viby J (DK)

(73) Assignee: Apator Miitors APS (DK)

( * ) Notice: Subject to any disclaimer, the term of this patent is extended or adjusted under 35 U.S.C. 154(b) by 186 days.

(21) Appl. No.: 14/431,389

(22) PCT Filed: Aug. 26, 2013

(86) PCT No.: PCT/DK2013/050273
§ 371 (c)(1),
(2) Date: Mar. 26, 2015

(87) PCT Pub. No.: WO2014/048434
PCT Pub. Date: Apr. 3, 2014

(65) Prior Publication Data
US 2015/0282172 A1    Oct. 1, 2015

(30) Foreign Application Priority Data
Sep. 26, 2012    (DK) ................................ 2012 70585

(51) Int. Cl.
*H04W 72/04*       (2009.01)
*G01D 4/00*        (2006.01)
(Continued)

(52) U.S. Cl.
CPC ........ *H04W 72/0453* (2013.01); *G01D 4/002* (2013.01); *G01D 4/004* (2013.01);
(Continued)

(58) Field of Classification Search
None
See application file for complete search history.

(56) References Cited

U.S. PATENT DOCUMENTS 6,477,386 B1    11/2002    Giles
6,657,552 B2 *  12/2003    Belski ................... G01D 4/004
                                                340/870.02
(Continued)

FOREIGN PATENT DOCUMENTS

CN        1815146 A      8/2006
CN       102289923 A    12/2011
(Continued)

OTHER PUBLICATIONS

International Search Report Application No. PCT/DK2013/050273 Completed: Nov. 13, 2013; dated Nov. 25, 2013 3 pages.
(Continued)

*Primary Examiner* — Saba Tsegaye
(74) *Attorney, Agent, or Firm* — St. Onge Steward Johnston and Reens, LLC

(57) ABSTRACT

A wireless radio communication system for consumption meters is disclosed. The communication system includes one or more consumption meters arranged to be able to communicate using a first set of radio frequency bands, one or more mobile communication devices arranged to be able to communicate using a second set of radio frequency bands, and one or more meter reading systems arranged to be able to communicate using a third set of radio frequency bands, wherein the first set of radio frequency bands includes a HF band and a first VHF/UHF band, the second set of radio frequency bands includes at least the HF band and a second VHF/UHF band, and the third set of radio frequency bands includes at least the first VHF/UHF band.

20 Claims, 4 Drawing Sheets

Figure 1:
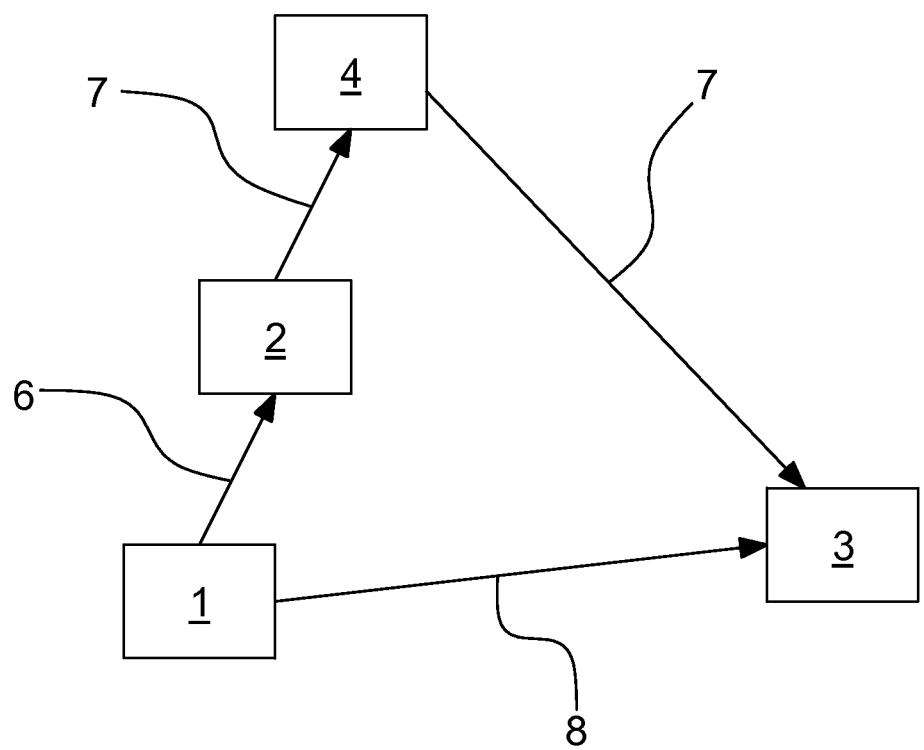

(51) Int. Cl.
  *H04B 5/00* (2006.01)
  *H04W 4/02* (2018.01)
  *H04W 84/04* (2009.01)
  *H04W 84/12* (2009.01)

(52) U.S. Cl.
  CPC ........... *G01D 4/006* (2013.01); *H04B 5/0031* (2013.01); *H04W 4/02* (2013.01); *H04W 4/80* (2018.02); *H04W 84/042* (2013.01); *H04W 84/12* (2013.01); *Y02B 90/242* (2013.01); *Y02B 90/243* (2013.01); *Y02B 90/246* (2013.01); *Y04S 20/322* (2013.01); *Y04S 20/325* (2013.01); *Y04S 20/42* (2013.01)

(56) References Cited

U.S. PATENT DOCUMENTS

| | | | |
|---|---|---|---|
| 6,836,737 B2 * | 12/2004 | Petite | G01D 4/004 340/870.02 |
| 6,867,707 B1 | 3/2005 | Kelley et al. | |
| 2009/0146838 A1 * | 6/2009 | Katz | G01D 4/006 340/870.02 |
| 2009/0153356 A1 | 6/2009 | Holt | |
| 2010/0207784 A1 * | 8/2010 | Bragg | H04W 52/0229 340/870.03 |
| 2011/0066297 A1 * | 3/2011 | Saberi | F16K 31/046 700/287 |
| 2011/0074603 A1 | 3/2011 | Cornwall et al. | |
| 2011/0273305 A1 | 11/2011 | Osterloh et al. | |
| 2012/0309311 A1 * | 12/2012 | Ohira | G08C 17/02 455/41.1 |

FOREIGN PATENT DOCUMENTS

| | | |
|---|---|---|
| DE | 102004055659 A1 | 6/2006 |
| DE | 102010052399 A1 | 5/2012 |
| EP | 2120016 A1 | 11/2009 |
| EP | 2246667 A1 | 11/2010 |
| GB | 2482326 A | 2/2012 |
| WO | 0225987 A2 | 3/2002 |
| WO | 03023415 A1 | 3/2003 |
| WO | 2006084462 A2 | 8/2006 |
| WO | 2006120285 A1 | 11/2006 |
| WO | 2007131169 A2 | 11/2007 |
| WO | 2007135233 A1 | 11/2007 |
| WO | 2009067260 A1 | 5/2009 |

OTHER PUBLICATIONS

European Standard—Communications Systems for Meters and Remote Reading of Meters—Part 4: Wireless Meter Readout (Radio Meter Reading for Operation in the 868 MHz to 870 MHz SRD band), © 2005 CEN All rights of exploitation in any form and by any means reserved worldwide for CEN national Members. 4 pages.
Introduction to NFC—Nokia, 30 pages. © 2011 Nokia Corporation. All reserved.
Smart Metering Infrastructure, Suez Environnement, Oct. 1, 2011, 2 pages.

* cited by examiner

WIRELESS RADIO COMMUNICATION SYSTEM FOR CONSUMPTION METERS

FIELD OF THE INVENTION

The present invention relates to a wireless system for radio communication between consumption meters and other units, such as for instance meter reading systems.

BACKGROUND OF THE INVENTION

Traditionally, the consumption registered by different forms of consumption meters (gas, water, electricity, etc.) were recorded by employees of the supplying authorities travelling around and visually reading the meter values displayed by the consumption meters. In a more modern approach, the consumer reads the consumption meter displays and sends the read values to a central register, for instance either by mail, telephone or e-mail or by entering the values on a web page on the Internet.

In the later years, automatic reading of the consumption meters has become increasingly more common. In this case, the consumption meter automatically transmits its reading values, typically by wireless radio communication. The data is typically transmitted either directly to a large system handling the readings from consumption meters in a larger (urban) area or to a so-called "concentrator". The concentrator handles a smaller number of consumption meters (for instance in a single building) and functions as a gateway to the larger (urban) system, for instance via the Internet.

In the case of installation of new consumption meters or replacement of existing consumption meters, however, the identification and location of the new consumption meter still has to be registered and entered into the system and/or the concentrator manually or by using expensive specialized equipment, before the consumption meter can be activated and its consumption readings registered.

BRIEF DESCRIPTION OF THE INVENTION

It is an object of the present invention to provide a wireless radio communication system for consumption meters, which eliminates the above-identified problems with systems known in the art.

The present invention relates to a wireless radio communication system for consumption meters, which communication system comprises one or more consumption meters arranged to be able to communicate using a first set of radio frequency bands, one or more mobile communication devices arranged to be able to communicate using a second set of radio frequency bands, and one or more meter reading systems arranged to be able to communicate using a third set of radio frequency bands, wherein the first set of radio frequency bands comprises a HF band and a first VHF/UHF band, the second set of radio frequency bands comprises at least said HF band and a second VHF/UHF band, and the third set of radio frequency bands comprises at least said first VHF/UHF band.

Using such a configuration, it is possible to automatically transmit data from a consumption meter to a mobile communication device, such as a smartphone with a suitable application designed therefore, because the consumption meter and the device are able to communicate with each other using the HF band.

In an embodiment of the invention, the third set of radio frequency bands comprises said HF band.

If the meter reading system is able to communicate in the HF band as well, the data from the consumption meter may be communicated to the system from the mobile communication device using the same HF band.

In an embodiment of the invention, the third set of radio frequency bands comprises said second VHF/UHF band.

If the meter reading system is able to communicate in the same VHF/UHF as the mobile communication device, the consumption meter data can also be communicated from the mobile communication device to the meter reading system without using the HF band.

In an embodiment of the invention, the HF band is used for near field communication, for instance according to NFC or RFID standards as known within the field.

Using such a configuration, it is possible to automatically register data from a consumption meter simply by placing the mobile communication device physically on or close to the consumption meter. The data from the consumption meter can then be communicated to the mobile communication device through near field communication in the HF band without using any energy from the battery of the consumption meter, since all the necessary energy for the communication may be delivered by the mobile communication device. Similarly, the consumption meter data may be transferred from the mobile communication device to the meter reading system by simply placing the device on or near to the system or a part thereof.

In an embodiment of the invention, said first VHF/UHF band is different from said second VHF/UHF band.

Typically, the second VHF/UHF band used by the mobile communication device will be a licensed band used for wireless telephony according to certain standards, such as for instance the GSM standard or the like. Apart from using licensed frequency bands, such standards typically requires the communication to follow rather energy-consuming communication protocols.

Consumption meters, in which the batteries cannot be easily replaced or recharged, usually communicate using far less energy-consuming protocols. This communication typically either uses frequency bands dedicated for meter communication, such as for instance the 169 MHz band (in Europe) or one of the open ISM (Industrial Scientific Medical) frequency bands, such as the 433 MHz band or the 868 MHz band (in Europe) or the 2.4 GHz band (worldwide).

In an embodiment of the invention, the HF band is used for transferring at least meter identification information.

Transferring meter identification information to the mobile communication device is advantageous, because this information will typically have to be registered manually in systems known in the art.

In an embodiment of the invention, the first VHF/UHF band is used for transferring at least meter consumption data from the one or more consumption meters to the one or more meter reading systems.

Once the consumption meter has been registered and activated in the system, it is advantageous if it is able to transfer consumption data directly to the system whenever appropriate.

In an embodiment of the invention, the second VHF/UHF band is used for communication with a public cellular mobile communication system.

If the second VHF/UHF band is chosen appropriately, existing mobile telephone systems may be used for communication between the mobile communication device, the consumption meter and/or the meter reading system.

In an embodiment of the invention, the one or more mobile communication devices are adapted to obtain location data about their own positions.

If the mobile communication device is able to locate its own position, for instance using GPS or another common positioning system, no manual registration of the position is needed.

In an embodiment of the invention, the second VHF/UHF band is used for transferring meter identification information and said location data to one or more of the one or more meter reading systems.

In this way, all the consumption meter data needed for registration and activation of the consumption meter can be automatically transferred to the system in one step only.

FIGURES

Figure 2:
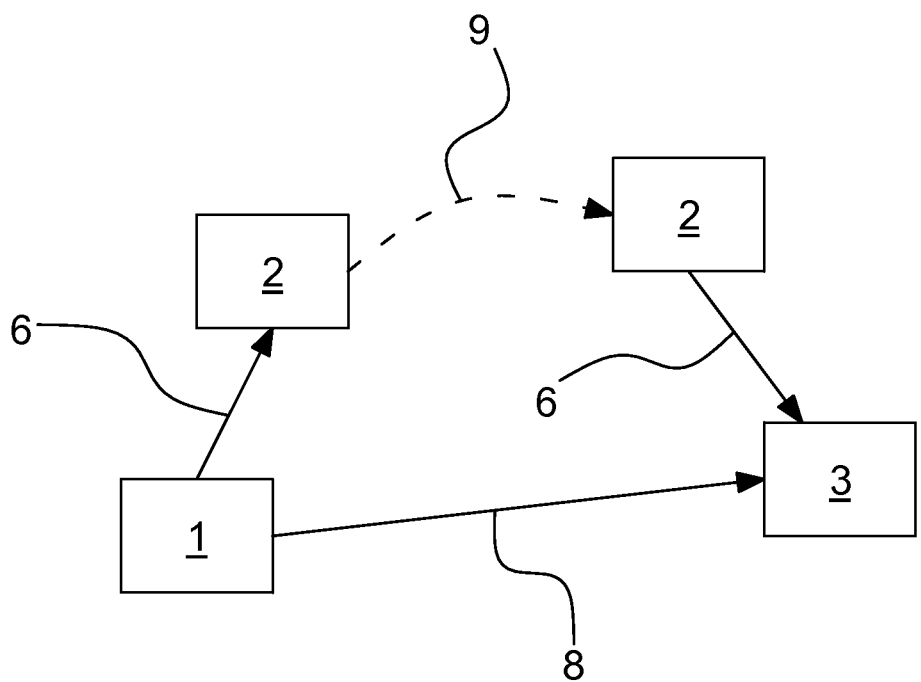
Figure 3:
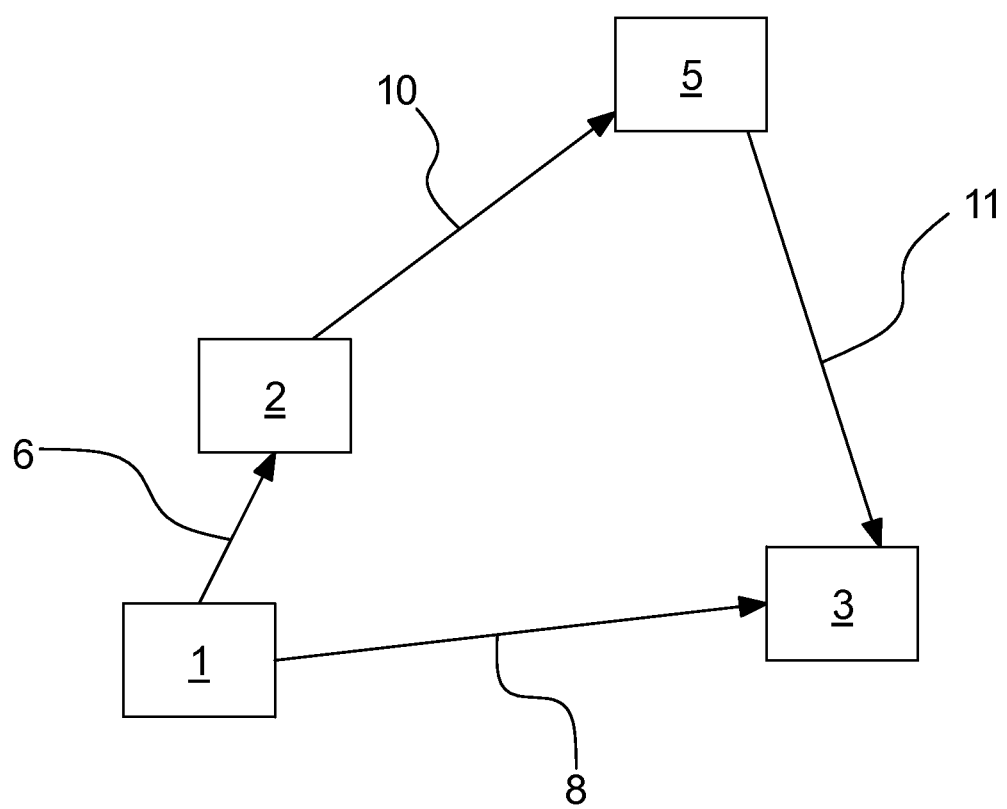
Figure 4:
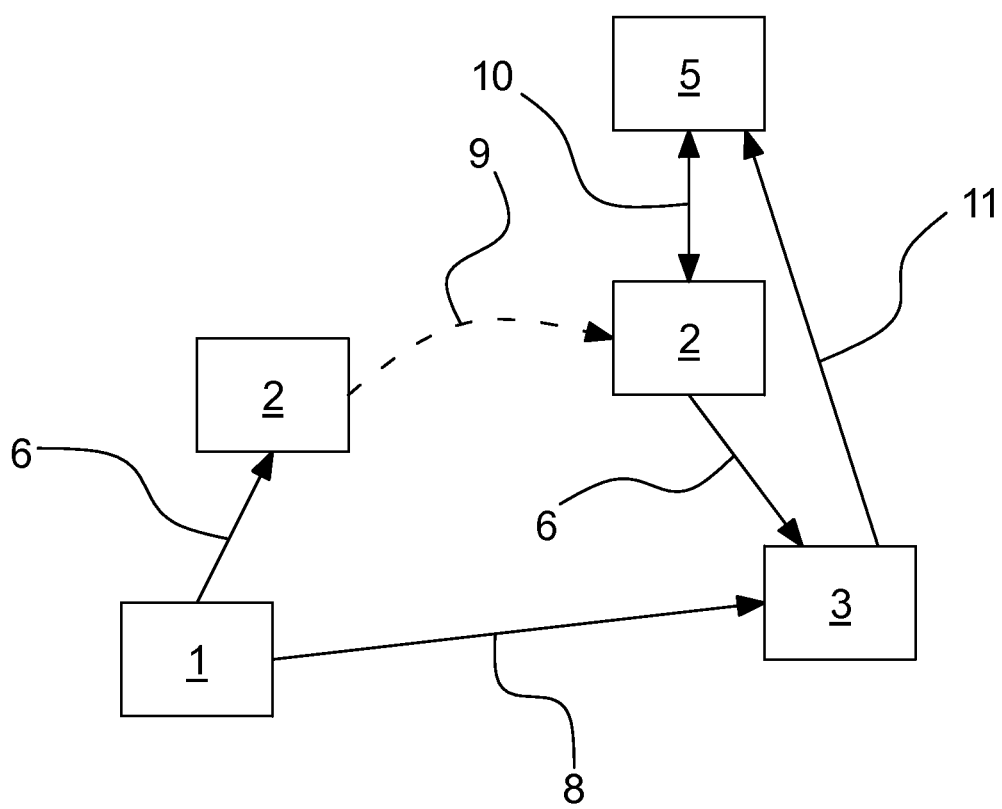

In the following, a few exemplary embodiments of the invention will be described with reference to the figures, of which FIG. 1 illustrates schematically a radio communication system according to a first embodiment of the invention, FIG. 2 illustrates schematically a radio communication system according to a second embodiment of the invention, FIG. 3 illustrates schematically a radio communication system according to a third embodiment of the invention, and FIG. 4 illustrates schematically a radio communication system according to a fourth embodiment of the invention.

DETAILED DESCRIPTION OF THE INVENTION

FIG. 1 illustrates schematically a radio communication system according to a first embodiment of the invention, in which a consumption meter 1 communicates using two different radio frequency bands 6, 8.

After installation or replacement of the consumption meter 1, meter identification data is sent to a smartphone 2 using near field communication in an HF band 6. If the smartphone 2 is placed on or near to the consumption meter 1, common near field communication standards like RFID or NFC may be used to transfer such data from the consumption meter 1 to the smartphone 2 using electric power only from the battery in the smartphone 2, which, contrary to the battery in the consumption meter 1, may be easily recharged.

When the smartphone 2 is placed on or near to the consumption meter 1, a suitable smartphone application may be used to fetch the identification data from the consumption meter 1 and to locate the position of the smartphone 2 using built-in GPS facilities or other positioning systems and/or routines. In the configuration shown in FIG. 1, this identification and location data is sent by the smartphone 2 to a concentrator 3 via a WiFi router 4 using common WiFi communication in a UHF band 7 for registration and activation of the consumption meter 1.

The concentrator 3 is a unit, which is set up to collect data from a number of consumption meters 1 (for instance in a large building), which are registered and activated as belonging to the system, and to forward this data to a consumption registration and billing system 5 (not shown in FIG. 1), for instance by working as a gateway to the Internet.

During normal operation of the consumption meter 1, consumption data are sent by radio communication in a first VHF/UHF band 8 directly from the consumption meter 1 to the concentrator 3.

In the second embodiment illustrated in FIG. 2, the consumption meter 1 communicates by the same channels 6, 8 as shown in FIG. 1. In this case, however, the smartphone 2 does not communicate with the concentrator 3 using WiFi. Instead, the smartphone 2 is physically moved (indicated by the punched arrow 9) from the consumption meter 1 to the concentrator 3 and the identification and location data of the consumption meter 1 is transferred to the concentrator 3 using near field communication 6 like the one between the consumption meter 1 and the smartphone 2. This requires, of course, that the concentrator 3 is able to communicate in the HF band as well.

FIG. 3 illustrates a third configuration of a radio communication system according to the invention. Again, the consumption meter 1 communicates by the same channels 6, 8 as shown in the previous figures.

Here, the smartphone 2 sends the identification and location data of the consumption meter 1 to a central consumption registration and billing system 5 using a second VHF/UHF radio frequency band 10, for instance via a common mobile telephone system such as GMS or a similar system. The consumption registration and billing system 5, in turn, forwards the identification and location data to the concentrator 3, which must collect the data from the consumption meter 1 for registration and activation of the consumption meter 1 with that concentrator 3.

The embodiment of the radio communication system illustrated in FIG. 4 is a further development of the configuration shown in FIG. 2. It is illustrated how the concentrator 3 may send collected consumption data from one or more consumption meters 1 to the consumption registration and billing system 5. This transfer of data may, for instance, be done using a third VHF/UHF radio frequency band or via the Internet 11.

Furthermore, it is illustrated how the smartphone 2 is in bidirectional communication with the consumption registration and billing system 5 using a second radio frequency band 10 as the one shown in FIG. 3. In this way, it is possible for the consumption registration and billing system 5 to send a message back to the smartphone 2 that the consumption meter 1 has, in fact, been registered and activated with the correct concentrator 3 so that the application in the smartphone 2 can end the registration and activation procedure in a secure and safe way.

The above described configurations of the radio communication system are exemplary embodiments only and are not meant to be limiting or defining for the scope of protection. It will be obvious to the person skilled in the art how the system may be configured in various other ways within the scope of protection as defined by the below patent claims. For instance, two or more of the mentioned VHF/UHF radio frequency bands 8, 10, 11 may be identical or overlapping.

LIST OF REFERENCE NUMBERS

1. Consumption meter
2. Smartphone
3. Concentrator
4. WiFi router
5. Consumption registration and billing system
6. Near field communication in an HF band
7. WiFi communication in a UHF band
8. Far field communication in a first VHF/UHF band
9. Physical movement of smartphone
10. Far field communication in a second VHF/UHF band 11. Far field communication in a third VHF/UHF band or via the Internet

The invention claimed is:

1. A wireless radio communication system for consumption meters, which communication system comprises
one or more consumption meters arranged to be able to communicate using a first set of radio frequency bands comprising a HF band and a first VHF/UHF band,
one or more mobile communication devices arranged to be able to communicate using a second set of radio frequency bands comprising at least said HF band and a second VHF/UHF band, and
one or more meter reading systems arranged to be able to communicate using a third set of radio frequency bands comprising at least said first VHF/UHF band,
wherein
the HF band is used during a consumption meter registration step for near field communication, in accordance with one or both of NFC and RFID standards, for transferring at least meter identification information from at least one of the one or more consumption meters to at least one of the one or more mobile communication devices,
the first VHF/UHF band is used during a consumption meter operating step for transferring at least meter consumption data from at least one of the one or more consumption meters to at least one of the one or more meter reading systems, and
the third set of radio frequency bands comprises one or both of said HF band and said second VHF/UHF band so as to enable at least one of the one or more mobile communication devices to transmit the meter identification information to at least one of the one or more meter reading systems.

2. The communication system according to claim 1, wherein said first VHF/UHF band is different from said second VHF/UHF band.

3. The communication system according to claim 1, wherein the second VHF/UHF band is used for communication with a public cellular mobile communication system.

4. The communication system according to claim 1, wherein the second VHF/UHF band is used for WiFi communication.

5. The communication system according to claim 1, wherein the one or more mobile communication devices are arranged to obtain location data about their own positions.

6. The communication system according to claim 5, wherein at least one of the one or more mobile communication devices transfers said location data together with said meter identification information to at least one of the one or more meter reading systems.

7. The communication system according to claim 1, wherein the communication system is arranged to power the near field communication between the one or more consumption meters and the one or more mobile communication devices from a battery of the one or more mobile communication devices.

8. The communication system according to claim 1, wherein the communication system is arranged to engage the one or more mobile communication devices in relation to installation or replacement of at least one of the one or more consumption meters, and engage the one or more meter reading systems in relation to collecting consumption data from the one or more consumption meters regularly.

9. A method for registering and operating a consumption meter with a meter reading system, the method comprising the steps of:
registering the consumption meter with the meter reading system by:
transferring a meter identification information of the consumption meter to a mobile communication device from the consumption meter using near field communication, in accordance with one or both of NFC and RFID standards; and
transferring the meter identification information of the consumption meter to the meter reading system from the mobile communication device using near field communication or communication in a second VHF or UHF radio frequency band;
operating the consumption meter by:
transferring consumption data of the consumption meter to the meter reading system from the consumption meter using communication in a first VHF or UHF radio frequency band.

10. The method of claim 9, wherein said first VHF or UHF band is different from said second VHF or UHF band.

11. The method of claim 9, wherein the second VHF or UHF band is used for communication with a public cellular mobile communication system.

12. The method of claim 9, wherein the second VHF or UHF band is used for WiFi communication.

13. The method of claim 9 comprising a step of the mobile communication device obtaining location data about its position.

14. The method of claim 13, wherein the mobile communication device transfers said location data together with said meter identification information to the meter reading system.

15. The method of claim 9, wherein the near field communication is performed with the consumption meter as a passive part and the mobile communication device as an active part so that the near field communication uses energy from a battery of the mobile communication device.

16. A method for registering and operating a consumption meter with a meter reading system, the method comprising the steps of:
installing or replacing a consumption meter being battery powered;
registering the consumption meter with the meter reading system by
transferring a meter identification information from the consumption meter to the meter reading system by means of a mobile communication device;
obtaining the meter identification information from the consumption meter by near field communication in accordance with one or both of NFC and RFID standards,
powering said near field communication by a battery of the mobile communication device; and
transferring the obtained meter identification information to one selected from the group of:
a concentrator of the meter reading system, the transferring using near field communication in accordance with one or both of NFC and RFID standards or the transferring using common WiFi communication; and
a registration and billing system of the meter reading system, the transferring using a public cellular mobile communication system;
operating the consumption meter by
transferring consumption data of the consumption meter from the consumption meter to the concentrator using communication in a VHF/UHF radio frequency band.

17. The method of claim 16, further comprising the step of the one among the concentrator and the registration and billing system having received said meter identification information from the mobile communication device transfers the meter identification information to the other, so that the consumption meter is registered with both the concentrator and the registration and billing system.

18. The method of claim 16, further comprising the step of the registration and billing system sending a message to the mobile communication device that the consumption meter is registered with the concentrator.

19. A wireless radio communication system for consumption meters, which communication system comprises
 a consumption meter registration system comprising a battery powered consumption meter, a mobile communication device and a meter reading system;
  wherein the consumption meter is arranged to transfer meter identification information to the mobile communication device by means of near field communication in accordance with one or both of NFC and RFID standards, wherein the near field communication between the consumption meter and the mobile communication device is powered from a battery of the mobile communication device, and
  wherein the meter reading system is arranged to receive said meter identification information from the mobile device via one selected from the groups of:
   a concentrator, the receiving being by near field communication in accordance with one or both of NFC and RFID standards or the receiving being by common WiFi communication; and
   a registration and billing system, the receiving using a public cellular mobile communication system;
 a consumption meter operating system comprising said consumption meter and said meter reading system;
  wherein the consumption meter is arranged to transfer consumption data to said concentrator using communication in a VHF/UHF radio frequency band.

20. The wireless radio communication system according to claim 19, wherein said consumption meter operating system does not comprise said mobile communication device.

* * * * *